United States Patent
Braun et al.

(10) Patent No.: US 11,439,564 B2
(45) Date of Patent: Sep. 13, 2022

(54) METHOD AND APPARATUS FOR AUGMENTED LOCOMOTION

(71) Applicant: VANDERBILT UNIVERSITY, Nashville, TN (US)

(72) Inventors: David Braun, Nashville, TN (US); Amanda Sutrisno, Nashville, TN (US); Tiange Zhang, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 0 days.

(21) Appl. No.: 17/127,080

(22) Filed: Dec. 18, 2020

(65) Prior Publication Data

US 2021/0186793 A1 Jun. 24, 2021

Related U.S. Application Data

(60) Provisional application No. 63/107,986, filed on Oct. 30, 2020, provisional application No. 62/950,641, filed on Dec. 19, 2019.

(51) Int. Cl.

| | |
|---|---|
| *A61H 3/00* | (2006.01) |
| *A63B 25/00* | (2006.01) |
| *A61H 1/02* | (2006.01) |
| *A63B 21/00* | (2006.01) |
| *A63B 21/04* | (2006.01) |
| *A63B 21/02* | (2006.01) |
| *A63B 23/04* | (2006.01) |
| *A63B 21/008* | (2006.01) |

(52) U.S. Cl.
CPC ......... *A61H 1/0262* (2013.01); *A61H 1/0214* (2013.01); *A61H 3/00* (2013.01); *A63B 21/0085* (2013.01); *A63B 21/00181* (2013.01); *A63B 21/023* (2013.01); *A63B 21/026* (2013.01); *A63B 21/0428* (2013.01); *A63B 23/0405* (2013.01); *A63B 25/00* (2013.01); *A61H 2003/007* (2013.01); *A61H 2201/1269* (2013.01); *A61H 2201/1642* (2013.01); *A63B 21/4011* (2015.10)

(58) Field of Classification Search
CPC ................................................ A63B 25/00–06
USPC ........................................................ 623/28
See application file for complete search history.

(56) References Cited

U.S. PATENT DOCUMENTS

| | | | | |
|---|---|---|---|---|
| 241,226 | A * | 5/1881 | Landis ................... | A63B 25/00 623/28 |
| 1,561,516 | A * | 11/1925 | Glowa ................... | A63B 25/06 36/7.8 |

(Continued)

OTHER PUBLICATIONS

Journal of Medical Devices vol. 9 "Nonlinear Passive Cam-Based Springs For Powered Ankle Prostheses" Jonathan Realmuto, Glenn Klute, Santosh Devasia Mar. 2015 (Year: 2015).*

*Primary Examiner* — Nyca T Nguyen
(74) *Attorney, Agent, or Firm* — Thomas | Horsetemeyer, LLP

(57) ABSTRACT

Provided are apparatuses for augmenting human speed, human-driven compliant mechanisms, artificial limbs to augment human movement, and the like. The apparatuses can include variable stiffness mechanisms including springs that can be configured to selectively store and subsequently release energy generated by human movement. The apparatuses can selectively release the captured energy supplied by the human to provide force and power output beyond the physical capability of the human.

19 Claims, 4 Drawing Sheets

Augmented Human

(56) References Cited

U.S. PATENT DOCUMENTS

| | | | | |
|---|---|---|---|---|
| 2,351,145 A * | 6/1944 | Pearson | A63B 25/00 | 623/28 |
| 2,802,217 A * | 8/1957 | Wilhoyte | A63B 25/00 | 623/28 |
| 2,837,335 A * | 6/1958 | Koenig | A63B 25/00 | 623/28 |
| 2,923,947 A * | 2/1960 | Weighill | A01D 46/243 | 623/28 |
| 3,673,615 A * | 7/1972 | Ellis | A63B 25/00 | 623/28 |
| 3,735,980 A * | 5/1973 | Weiss | A63B 25/00 | 482/75 |
| 4,194,751 A * | 3/1980 | Shinmura | A63B 25/04 | 280/11.201 |
| 5,020,790 A * | 6/1991 | Beard | A61F 5/0102 | 482/4 |
| 5,295,932 A * | 3/1994 | Rowan | A63B 25/00 | 482/75 |
| 5,343,856 A * | 9/1994 | Proctor | A61H 1/0214 | 482/60 |
| 5,484,363 A * | 1/1996 | Creelman | A63B 21/023 | 482/71 |
| 7,946,966 B1 * | 5/2011 | Graham | A63B 25/00 | 482/76 |
| 8,172,730 B2 * | 5/2012 | Emmert | A63B 25/02 | 482/75 |
| 8,814,949 B2 * | 8/2014 | Gramnaes | A61F 2/70 | 623/27 |
| 9,604,368 B2 * | 3/2017 | Holgate | B25J 17/0216 | |
| 10,098,778 B1 * | 10/2018 | Asada | A61F 5/028 | |
| 2003/0134720 A1 * | 7/2003 | Yoon | A63B 25/10 | 482/77 |
| 2006/0217241 A1 * | 9/2006 | Novara | A63B 25/00 | 482/75 |
| 2007/0037667 A1 * | 2/2007 | Gordon | A63B 22/0056 | 482/51 |
| 2007/0167296 A1 * | 7/2007 | Hika | A63B 25/00 | 482/76 |
| 2007/0270288 A1 * | 11/2007 | Hansard | A63B 25/00 | 482/75 |
| 2008/0058171 A1 * | 3/2008 | Sener | A63B 25/00 | 482/75 |
| 2008/0096732 A1 * | 4/2008 | Lin | A63B 25/00 | 482/75 |
| 2009/0203504 A1 * | 8/2009 | Williams | A63B 25/02 | 482/75 |
| 2011/0130251 A1 * | 6/2011 | Emmert | A63B 25/02 | 482/76 |
| 2013/0210587 A1 * | 8/2013 | Shank | A63B 25/08 | 482/77 |
| 2014/0315693 A1 * | 10/2014 | Randle | A63B 69/16 | 482/57 |
| 2015/0321342 A1 * | 11/2015 | Smith | B25J 9/0009 | 74/490.03 |
| 2018/0015323 A1 * | 1/2018 | Yang | A61H 3/0277 | |
| 2018/0207466 A1 * | 7/2018 | Krishnan | A63B 23/1281 | |
| 2019/0262214 A1 * | 8/2019 | Smith | A61H 1/024 | |
| 2021/0228430 A1 * | 7/2021 | Farris | A61H 1/024 | |

* cited by examiner

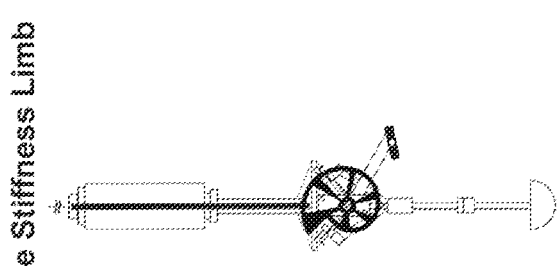
Variable Stiffness Limb
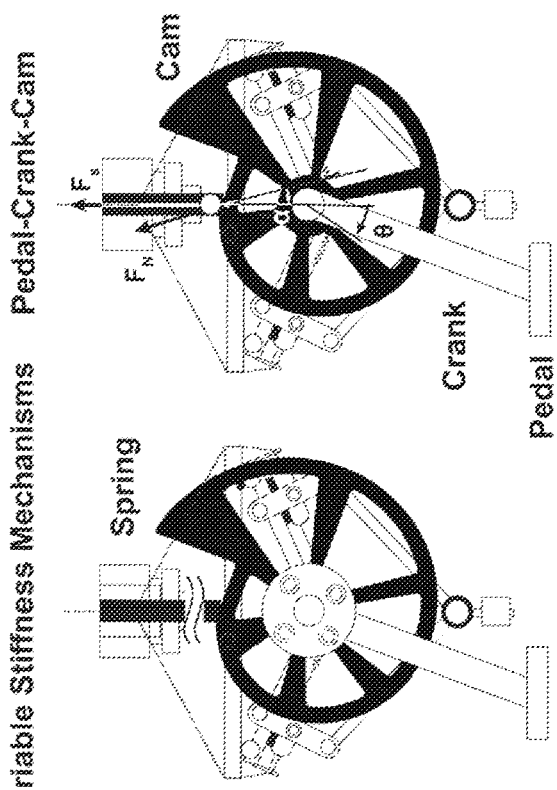
Variable Stiffness Mechanisms
Fig. 2A
Fig. 2B Pedal-Crank-Cam
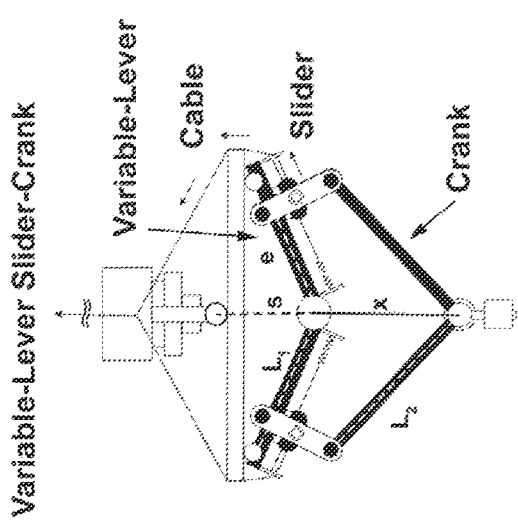
Fig. 2C Variable-Lever Slider-Crank

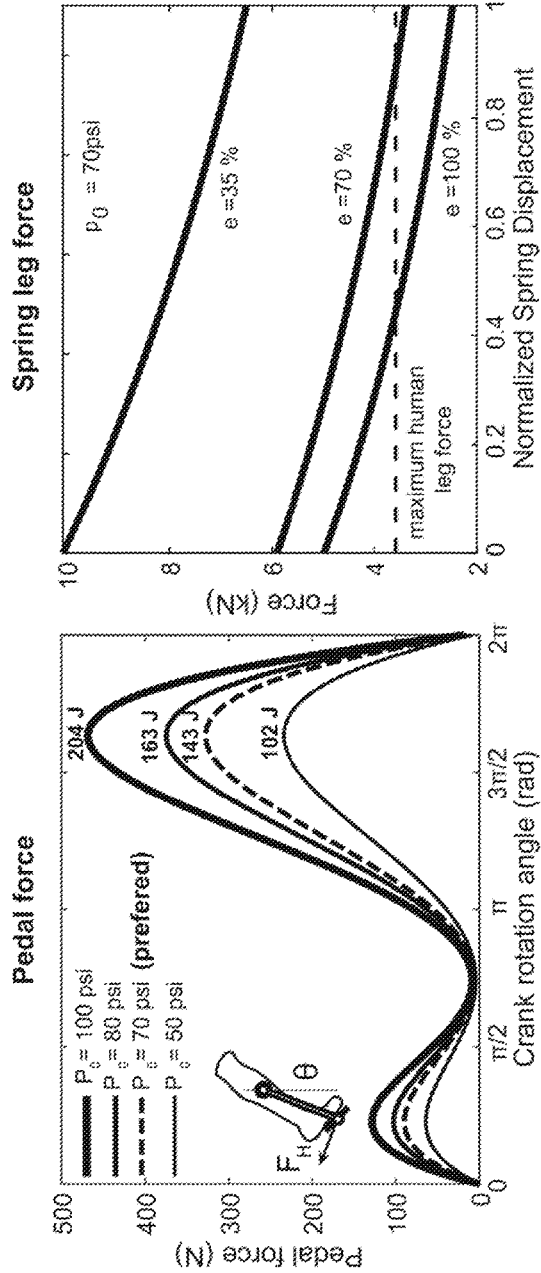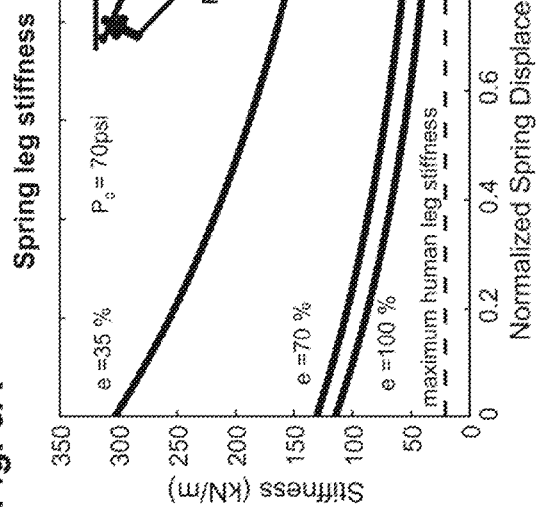
Fig. 3A
Fig. 3B
Fig. 3C

METHOD AND APPARATUS FOR AUGMENTED LOCOMOTION

CROSS-REFERENCE TO RELATED APPLICATIONS

This application claims the benefit of and priority to U.S. Provisional Application Ser. No. 62/950,641, having the title "METHOD AND APPARATUS FOR FACILITATING RUNNING", filed on Dec. 19, 2019; and claims the benefit of and priority to U.S. Provisional Application Ser. No. 63/107,986, having the title "HUMAN COMPLIANT TRANSMISSION MECHANISM", filed on Oct. 30, 2020, the disclosures of each of which are incorporated herein by reference in their entireties.

STATEMENT REGARDING FEDERALLY SPONSORED RESEARCH OR DEVELOPMENT

There was no Federal funding used for this invention.

FIELD OF THE INVENTION

The present disclosure relates to augmented running devices, and more particularly, to augmented running devices that utilize one or more variable stiffness springs.

BACKGROUND

The top speed of human running is less than half the top speed of cycling, despite both motions being human-powered. Cycling is faster than running partly because (1) the rolling motion of the wheels prevents collision energy losses from stepping, (2) wheels can support the weight of the body in place of the legs, but also because (3) pedals enable the human to supply energy continuously in the air instead of intermittently when the leg is on the ground. These three features enable the bicycle to double the top speed of running, despite supplying no external energy and adding to the weight of the human.

Current running exoskeletons use fixed-stiffness springs in parallel with the legs to support the body and prevent collisional energy losses but require the human to supply energy while pushing against the ground, as in natural running. These exoskeletons have limitations in reducing the metabolic cost of running or increasing the top speed of running. The limitations have been attributed to both the energy required to swing the legs with the added mass of the exoskeleton and inefficient energy transfer between the human and the exoskeleton.

However, with a hypothesized ideal massless exoskeleton and perfect energy transfer between the human and the exoskeleton, the speed limit of the human augmented with a fixed stiffness spring would remain considerably below (65%) the air resistance speed limit in cycling (100%). This is because, despite using springs in parallel with the legs, the ground contact time reduces to 0.1 s at the top speed of natural running, which limits the amount of energy the legs can supply while pushing against the ground in high-speed running.

SUMMARY

Embodiments of the present disclosure provide apparatuses for augmenting human speed and the like. An embodiment of the present disclosure includes an augmented running device to increase a running speed of a user. The device can include a spring configured to be removably coupled to a user. The device can also include a variable stiffness mechanism that can selectively modify the stiffness of the spring, and a clutch for intermittently coupling and decoupling the spring from the user. The spring is compressed by the user during the swing phase of user's running cycle and is released when the user impacts a running surface to propel the user forward.

An embodiment of the present disclosure also includes a human-driven compliant mechanism. The mechanism includes an elastic energy storage element that is configured to capture energy supplied by the human and an adjustable lever that can vary the stiffness of the elastic energy storage element. The human-driven compliant mechanism is operable to selectively release the captured energy supplied by the human to provide force and power output beyond the physical capability of the human.

An embodiment of the present disclosure also includes an artificial limb operable to augment human movement. The artificial limb can include a pedal configured to be removably coupled to a limb of a user, a cam, a crank coupled to the pedal and operable to rotate the cam, and a variable stiffness spring in mechanical communication with the cam. The variable stiffness spring can be configured to selectively store and subsequently release energy generated by the human movement.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIGS. 2A-2C illustrate elements of the human-driven adaptable-stiffness-spring artificial limb in accordance with embodiments of the present disclosure. FIG. 2A shows the pedal-crank-cam mechanism; FIG. 2B shows the air spring; FIG. 2C shows the adaptable slider-crank mechanism with a variable lever arm. At input, the cam represents the variable-length lever driven by the pedal-crank mechanism. The air spring represents the elastic element to store and capture energy. The rotational lever arm at the output represents the variable slider-crank mechanism to amplify output force and stiffness. The primary rotational arm directly coupled with the output of the spring has a length of $L_1$ where the secondary output rotational arm has the length of $L_2$. The distance measured from the connecting point to the shaft is e.

FIGS. 3A-3C provide simulation results for the artificial leg in accordance with embodiments of the present disclosure. Force-displacement curve for a subject cycling at 90 rpm with 280~W power generation rate is used to generate the cam profile (5), using the following parameters of the cylinder and crank arm $p_0$=70 psi; A=7 in$^2$; $s_{max}$=189 mm; $L_1$=120 mm; $L_2$=220 mm. (FIG. 3A) Force applied by the human $F_h$ perpendicular to the pedal. (FIG. 3B) Force of the robotic leg F. (FIG. 3C) Stiffness of the robotic leg k.

Figure 1A:
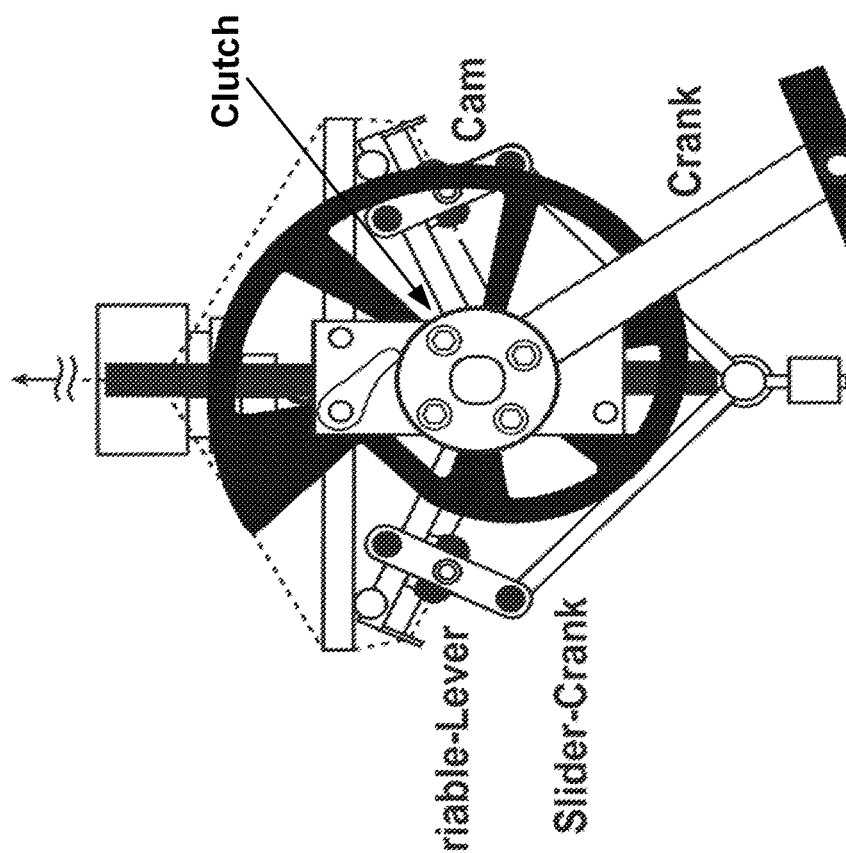
FIG. 1A is a drawing of an example of a human-driven spring-leg exoskeleton in accordance with embodiments of the present disclosure.
Figure 1B:
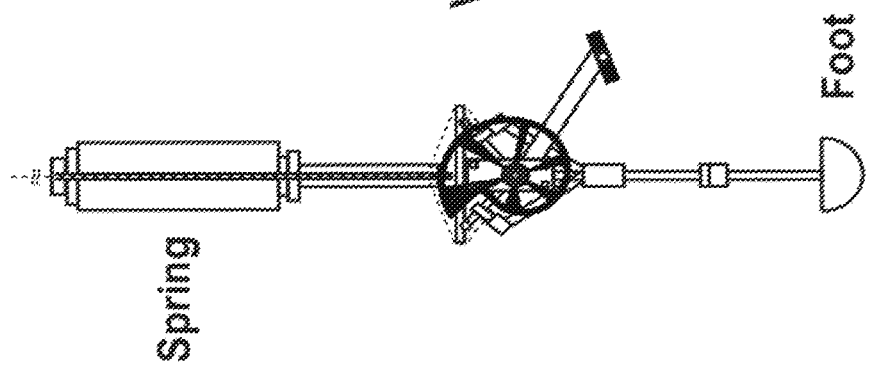
FIG. 1B is a drawing of an example of a spring-leg prototype in accordance with embodiments of the present disclosure.
Figure 1C:
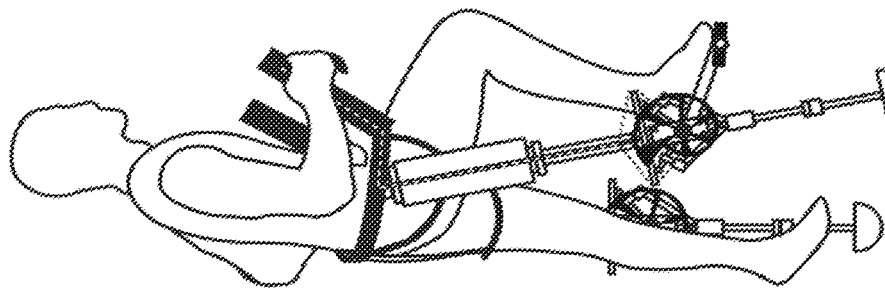
FIG. 1C is an example of a compliant transmission mechanism in accordance with embodiments of the present disclosure. The human-driven compliant transmission mechanism can amplify the force and power of the biological limb.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of mechanical engineering, robotics, and the like, which are within the skill of the art.

Before the embodiments of the present disclosure are described in detail, it is to be understood that, unless otherwise indicated, the present disclosure is not limited to particular materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

In accordance with the purpose(s) of the present disclosure, as embodied and broadly described herein, embodiments of the present disclosure, in some aspects, relate to apparatuses for augmenting human-generated power.

In general, embodiments of the present disclosure provide for human-driven compliant mechanisms, and products including human-driven compliant mechanisms such as augmented running devices and artificial limbs.

The present disclosure includes an augmented running device to increase a running speed of a user. Advantageously, the device can use passive energy generated by a human during the swing (e.g. the aerial phase) in a running stride and release the energy at leg touchdown. In some embodiments, because the device continually uses energy generated by the user, the large motors and batteries are not required to power the device.

In some embodiments, the device can be a human-driven spring-leg exoskeleton, which can be worn by a human to augment running, walking, or jumping. The device can include a spring configured to be removably coupled to a user. The spring is compressed by the user while in a swing phase of a running cycle of the user and is released when the user impacts a running surface to propel the user forward. The device can include a variable stiffness mechanism that selectively modifies the stiffness of the spring. A clutch can intermittently couple and decouple the spring from the user.

In some embodiments, the variable stiffness spring is an air spring. In some embodiments, the variable stiffness mechanism includes a cam. The air spring can store the energy provided by the human while the cam compresses the spring. The internal pressure inside the air spring cylinder can be modified based on the needs of the user. Lower resistance is desired as step frequency increases; thus, the pressure can be decreased accordingly by the user (e.g. using a valve). In other embodiments, the variable stiffness spring is a leaf spring. In some embodiments, the variable stiffness mechanism includes an adjustable lever. The leaf spring stores the energy provided by the human while the adjustable lever changes the stiffness of the spring.

In various embodiments, the lever has an adjustable length relative to its position along the slider crank. The length of the lever can be modified based on the needs of the user. Higher resistance is desired when step frequency decreases; thus, the length of the lever can be increased accordingly by the user, analagous to changing gears on a bicycle. The lever length can be adjusted by the user via a control. One such control can include a cable connected to the lever and operated by a hand mechanism, similar to a bicycle brake.

The present disclosure includes a human-driven compliant transmission mechanism. Advantageously, any form of cyclic limb motion can be used to input energy at a pace selected by the user through motion, and the captured energy can be stored and released to augment performance at variable and controllable rates. The captured energy can provide force and power output beyond a physical capability of the human, or greater than the input of the human. The device can include an elastic energy storage element configured to capture energy supplied by the human and an adjustable lever for varying the stiffness of the elastic energy storage element.

The elastic storage element can be a spring. In some embodiments, the spring is an air spring including an air cylinder. The adjustable lever can include a rotatable cam. The rotatable cam can be driven by the human. The cam can selectively vary a stiffness of the elastic energy storage element. In other embodiments, the variable stiffness spring is a leaf spring attached to a lever. The length of the lever can be changed by the human as described above. The lever with changeable length can selectively vary the stiffness of the elastic energy storage element.

In other embodiments, the elastic energy storage element is connected to a cam and/or a lever to capture energy to be transferred to the spring.

In some embodiments, the human-driven compliant mechanism is an exoskeleton configured to be removably coupled to a user. In some embodiments, the lever can be a pedal-crank-cam mechanism between the user's limb and the exoskeleton. The user's cyclic limb motion turns the pedal, which in turn supplies the energy to the cam to compress the spring.

In other embodiments, the human-driven compliant mechanism is an artificial limb adapted to be removably coupled to a user. In other embodiments, the artificial limb is adapted to be worn by the user and removably coupled to at least a portion of the user's leg.

The present disclosure includes an artificial limb operable to augment human movement. Advantageously, the artificial limb is operable to increase a running speed of the user. The limb can include a pedal configured to be removably coupled to a limb of a user and a cam. A crank can be coupled to the pedal and operable to rotate the cam. A variable stiffness spring can be in mechanical communication with the cam, and the spring can be configured to selectively store and subsequently release energy generated by the human movement.

In some embodiments, the variable stiffness spring can be an air spring. In other embodiments, the variable stiffness spring can be a coiled spring. In yet other embodiments, the variable stiffness spring can be a leaf spring.

In some embodiments, the leg force input by the user can be amplified by about 2 to 3 times, or about 2.5 times. The maximum stiffness of the biological limb (e.g. the user's limb) can be amplified from about 4 to 12 times, or about 10 times.

In some embodiments, the pressure in the air spring can be adjustable, such as through a valve to release the internal air pressure in the air spring cylinder. Lowering the pressure lowers the force required for the user to turn the pedal. The valve can be controlled by such as a switch operated by the user.

In some embodiments, the stiffness of the spring can be adjustable via the variable lever arm in the slider-crank mechanism. Changing the length of the lever arm increases or decreases the stiffness of the spring. The runner may use an effortless finger motion to change the stiffness of the spring by adjusting the lever in the slider-crank mechanism (part e in FIG. 4, steps a-d). Increasing the stiffness is required to redirect the motion of the body and to release the same amount of energy stored by the spring during shorter ground contact times. Therefore, increased spring stiffness is required as the runner picks up speed while decreased spring stiffness is required at lower speeds. The effect of changing the adjustable lever of the slider-crank mechanism "e" (FIG. 2C) is similar to the gear switching on the bicycle.

In some embodiments, there are two mechanisms, the pedal-crank-cam mechanism and the adjustable lever slider-crank mechanism.

The pedal-crank-cam mechanism enables the human limbs to supply as much energy as possible in each step. The stiffness of the pedal-crank-cam mechanism is adjusted to enable the human to supply as much energy as possible in each step. Enabling the human to supply more energy than in natural running is required to move faster.

The adjustable lever slider-crank mechanism functions to release all the energy supplied by the human in each step. The stiffness of the adjustable lever slider-crank mechanism is adjusted to release the energy provided by the human faster than what the human limbs could do and support the body with more force than what the human limbs could do. Releasing the energy provided by the human faster is required because the ground contact time decreases as the runner picks up speed. Supporting the body with more force is also required during the shorter ground contact times as the runner picks up speed.

In some embodiments, the combination of the adjustable lever slider-crank and the cam mechanism allows for adjustment of the stiffness of the limb without releasing or increasing the energy stored by the spring. This feature enables changing the stiffness of the spring at theoretically zero energy cost.

The aforementioned devices are not limited to a human augmentation device. The variable stiffness artificial limb of the present disclosure can be used to augment non-human animals. In such an application, the energy for the motion would be supplied by the animal instead of the human, while the adjustment of the limb stiffness would be automatized, similar to the automatic gear transmission in cars.

The devices described herein are not limited to augmentation of human or non-human animals. The variable stiffness artificial limb can be used as a robot limb to create a walking machine. In such an application, the human limb can be replaced with one or more actuators, for example, hydraulic, pneumatic, or electric motors. The actuators supply the energy instead of the human. The advantage of the variable stiffness artificial limb is that it can enable the actuators to operate at their most optimal operating point, the operating point defined by the highest efficiency, to supply more energy within the same time. The extra amount of energy would enable walking machines to move faster or remain functional longer, given the same power supply.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

In order to provide explosive power for jumping higher, walking with a heavy weight or running faster, a temporary energy reservoir (e.g. a spring) is needed. A spring attached to the legs, could enable the human to supply energy during the aerial phase of the legs during jumping, walking, and running, similar to when pedaling a bicycle. Subsequently, the energy in the spring could be released as it contacts the ground to accelerate the body upwards in jumping or forward in running. However, a stiff spring cannot be compressed by the legs to supply energy, while a compliant spring cannot provide enough force to accelerate the body when pushing against the ground. A sophisticated human-driven variable stiffness spring, such as those provided herein, may accommodate the aforementioned attributes.

Described herein is a human-driven compliant transmission mechanism (FIGS. 1A-1C, and 2A-2C) (e.g. an energetically-passive variable stiffness spring) that can capture, store, and release the energy supplied by the human at a desired rate to provide force and power beyond the capability of the biological limb. The mechanism combines a lever and a catapult, and consists of three main components: (i) a pedal-crank-cam mechanism that mitigates the force-velocity limitation while takes into account the configuration dependent force of the biological limb, (ii) a spring with sufficient energy storage capacity to store the energy supplied by the limbs during locomotion—enabling the legs to supply energy in the air, and (iii) an adjustable lever to modify the force, and stiffness provided by the spring-leg, as required to accelerate the body beyond what is possible by the biological limb.

The mechanism described herein generalizes the rigid transmission mechanism used for continuous energy supply in the bicycle, as it enables intermittent energy supply, energy storage, and controllable energy release that mitigates both the force-velocity and the configuration-dependent force limitation of the biological limb. The human driven mechanism of the present example is a prototype including components of next-generation, energetically passive human augmentation devices that could enhance human peak performance without large motors and heavy batteries that provide external energy.

Compliant Transmission Mechanism

FIGS. 2A-2C show a schematic representation of the mechanism that consists of (i) a lever between the human limb and the artificial robot limb, represented by a pedal-crank-cam mechanism; (ii) an elastic energy storage element, represented by an air spring; and (iii) a lever between the energy storage element and the artificial limb, represented by an adaptable slider-crank mechanism.

The pedal-crank-cam mechanism (FIG. 2A) converts the cyclic leg motion to continuous rotation, similar to the pedal-crank mechanism of a bicycle. The cam establishes a kinematic coupling between the crank and the air cylinder. As the human turns the pedal, energy is continuously supplied while the cam is compressing the spring. Unlike the gear transmission of the bicycle, the cam accommodates the configuration-dependent leg force and thereby mitigates the limitation of the crank-pedal mechanism, as it allows the human to effectively supply energy independent of the crank angle. The same function does not exist on the bicycle as the variable-gear transmission can only mitigate the force-velocity limitation of human muscles between cycles, but cannot accommodate the configuration-dependent leg force within cycles. Although the pedal-crank-cam mechanism cannot accommodate for the force-velocity limitation of the limb, it can be done by changing the internal pressure of the air cylinder.

The air spring (FIG. 2B) stores the energy provided by the human while the cam compresses the spring. Pre-pressurized air springs can be used as energy storage elements. The air spring is also used here to accommodate the force-velocity relation of the human limb. This can be done by modifying the pressure inside the cylinder, as modifying the internal pressure is analogous to changing the stiffness of a helical spring, or leaf spring, by altering its effective length. As speed increases, with higher robot limb step frequency, the frequency of human limb also increases as less time is available for a complete revolution, and lower resistance is desired for limb motion at higher frequencies. Therefore, the pressure in the air cylinder needs to be decreased. This can be achieved by switching on/off a valve similar to when moving the gear-shift knob in the bicycle. Both can be done without external energy by an effortless finger movement. Alternatively, the pressure change can be achieved by small actuators, hydraulic, pneumatic, or electric motors, using minimal external energy, replacing the energy that would be otherwise supplied by moving the gear-shift knob in the bicycle.

The adaptable slider-crank mechanism (FIG. 2C) uses a variable lever arm to amplify the motion, force, and stiffness of the air spring to the motion, force, and stiffness of the artificial limb. The amplified force and power enable the artificial limb to simultaneously provide large force and explosive power, or fast energy release, exceeding the limitations of the biological limb due to the force-velocity trade-off. Bypassing the force-velocity trade-off is crucial to augment humans for different tasks, such as jumping, fast loaded-walking, and running, with vastly different force and power requirements.

The artificial limb augmenting the human like a bicycle, takes any form of cyclic limb motion as input, captures energy like an advanced bicycle, stores the captured energy, and releases the stored energy like a variable stiffness spring catapult. The artificial limb augmenting the human enables the human to supply energy at self-selected paces while storing and releasing the captured energy at variable and controllable rates with amplified force and power to augment human peak performance.

Mathematical Model

Below is the derivation of the mathematical model of the mechanism shown in FIGS. 2A-2C. The mechanism is divided into two functional units. The first unit is the pedal-crank-cam mechanism connected to the air spring; this unit is used by the human to supply energy. The second functional unit is the air spring together with the variable lever mechanism; this unit is used to amplify the leg force and release the energy stored by the spring. In the model below, we assume no energy loss due to friction, no transient thermodynamic effects, and we consider air to obey the ideal gas law.

Model of the pedal-crank-cam mechanism connected to the air spring: The moment felt by the human limb $M_h$—or the resistive force felt by the human limb perpendicular to the pedal $F_h$—is given by:

$$M_h(\theta; p_0) = F_h(\theta; p_0)L_c = \frac{dr(\theta)}{d\theta} \frac{p_0}{p_0^*} F_s^*(s(\theta)) \qquad (1)$$

where $\theta$ is the rotation angle of the crank, $L_c$ is the crank length, r is the radius of the cam, $F_s$ is the force of the air spring, s is the deflection of the spring, $p_0$ is the internal pressure while $p_0^*$ is the nominal internal pressure of the air cylinder.

The force of the air cylinder at the nominal internal pressure is defined by:

$$F_s^*(s) = p_0^* A \frac{s_{max}}{s_{max} - s} \quad (2)$$

A is the cross-sectional area of the air chamber while $s_{max}$ the height of the chamber.

Due to the kinematic coupling between the cam and the air spring, the deflection of the spring is defined by the cam radius at a given angle $\theta$:

$$s(\theta) = r(\theta) - r_{min} \quad (3)$$

where $r_{min}$ the minimum radius of the cam. The shape of the cam $r(\theta)$ is defined by:

$$r(0) = r_{min} \text{ and } \frac{dr}{d\theta} = r\tan\alpha(\theta) \quad (4)$$

where $\alpha(\theta)$ is defined by the designer of the cam. For example, $\alpha(\theta)=0$ leads to a circular cam that imposes no resistive force to the human according to (1), while $\alpha(\theta)$ =would lead to a progressive cam (similar to FIG. 2B) that imposes more resistive force for larger rotation angles.

The key parameters of the pedal-crank-cam air spring unit are the cam-shape $r(\theta)$ and the internal pressure $p_0$ of the air cylinder. With a given cam-shape, higher internal pressure leads to more resistive force, creating an effect similar to higher-gear ratios in the bicycle. The preferred cam-shape could enable the legs to effectively supply energy given the configuration-dependent force limitation of the human limb. Assuming that the preferred configuration-dependent leg force is $M_H(\theta)$, the design of the cam can be formalized using (2), (4) and the following equation:

$$r\tan\alpha(\theta) = \frac{M_H(\theta)}{F_s^*(r)}. \quad (5)$$

FIG. 3A (dashed lines) shows the force-angle profile generated by the pedal-crank-cam mechanism which resembles the force-angle profile of a cyclist. Using such a pedal-crank-cam mechanism, the user would feel the same resistance force as during cycling, and could therefore continuously supply energy. FIG. 3A (solid lines) show that increasing the internal pressure of the cylinder $p_0$ could be used to generate more resistive force and therefore store more energy inside the cylinder; similarly, decreasing the internal pressure $p_0$ would require less effort and would result in less energy stored. In particular, the total energy stored ($E_s$) by the air cylinder after a full compression cycle is a linear function of $p_0/p_0^*$:

$$E_s = \frac{p_0}{p_0^*} E_s^* \quad (6)$$

where, the energy stored in the cylinder at the nominal internal pressure is:

$$E_s^* = p_0^* A s_{max} \ln \frac{s_{max}}{(s_{max} - r_{max} + r_{min})} \quad (7)$$

Consequently, changing the initial pressure of the cylinder, changing $p_0/p_0^*$, is similar to shifting gears on the bicycle.

Model of the variable moment-arm mechanism connected to the air spring: The force of the spring leg is the force provided by the spring amplified by the variable lever mechanism. The spring is initially compressed by $r_{max} - r_{min}$ via the cam (FIG. 2B) while it subsequently expands as it moves the variable lever mechanism (FIG. 2C). The relation between the displacement of the spring leg x and the spring deflection s is given by:

$$s(x; e) = \frac{L_1 x}{2e} \left( \frac{L_2^2 - e^2}{x^2} - 1 \right) - r_{min} \quad (8)$$

where $L_1$ and $L_2$ denote the lengths of the lever arms while e is the changeable effective length of arm $L_1$ shown in FIG. 2C. The range of leg displacements (FIGS. 2A-2C) is given by:

$$x \in [x_{min}, x_{max}] = [\sqrt{r_{max}^2 - L_1^2 + L_2^2} - r_{max}, L_2) \quad (9)$$

The force of the spring leg is given by:

$$F(x; e, p_0) = \frac{L_1}{2e} \left( \frac{L_2^2 - e^2}{x^2} + 1 \right) \frac{p_0}{p_0^*} F_s^*(s(x; e)) \quad (10)$$

while the stiffness of the leg is:

$$k(x; e, p_0) = \frac{dF(x; e, p_0)}{dx}. \quad (11)$$

With a given nominal pressure of the air cylinder $p_0/p_0^*$, the key design parameter during the expansion phase is the effective lever arm e of the slider-crank mechanism (FIG. 2C). The force and stiffness of the leg can be simultaneously amplified by modifying the lever arm e (FIG. 2C); smaller e results in smaller leg displacement (9) but larger force (10) and stiffness (11). Larger stiffness means that the energy stored by the spring will be released faster (assuming the same body mass) as reducing e amplifies force. This is similar to switching to a higher gear in the bicycle.

FIGS. 3B and 3C show the output force and stiffness of the robotic leg for different lever arm settings (different e in (10) and (11); in the proposed mechanism, both force and stiffness increase as e decreases. Furthermore, at $p_0=70$ psi, the maximum human leg force can be amplified over 2.5 times (FIG. 3B) while the maximum stiffness of the biological limb can be amplified up to 10 times (FIG. 3C). The amplification of the force and leg stiffness are both important as larger force is desired, and the same energy stored in the spring has to be released faster as the ground contact time is reduced in locomotion. Faster release of the same energy can be achieved by increasing the stiffness of a spring. Therefore, higher spring stiffness can generate the explosive power needed for locomotion tasks such as jumping and running.

Potential Applications

One of the potential applications (FIG. 4) that motivates the conception and creation of compliant transmission mechanisms is an energetically-passive human-driven artificial limb (FIG. 1). The following illustrates the working cycle of the limb in human running with the implementation of the variable stiffness spring.

(i) Human supplies energy (FIG. 4, steps a-d): Starting with toe-off in running (FIG. 4, step a), the swing leg turns the pedal-crank-cam clock-wise as if standing on a bicycle. The work done by the leg to overcome the resistance of the air cylinder is stored as potential energy inside of the cylinder. As the leg continues the up-stroke motion (FIG. 4, step b), the cylinder keeps storing more energy. The runner finishes the down-stroke motion (FIG. 4, step c) right before the spring leg touches the ground, where all the energy generated by the runner in the preceding swing phase (FIG. 4, step d) is stored.

Figure 4:
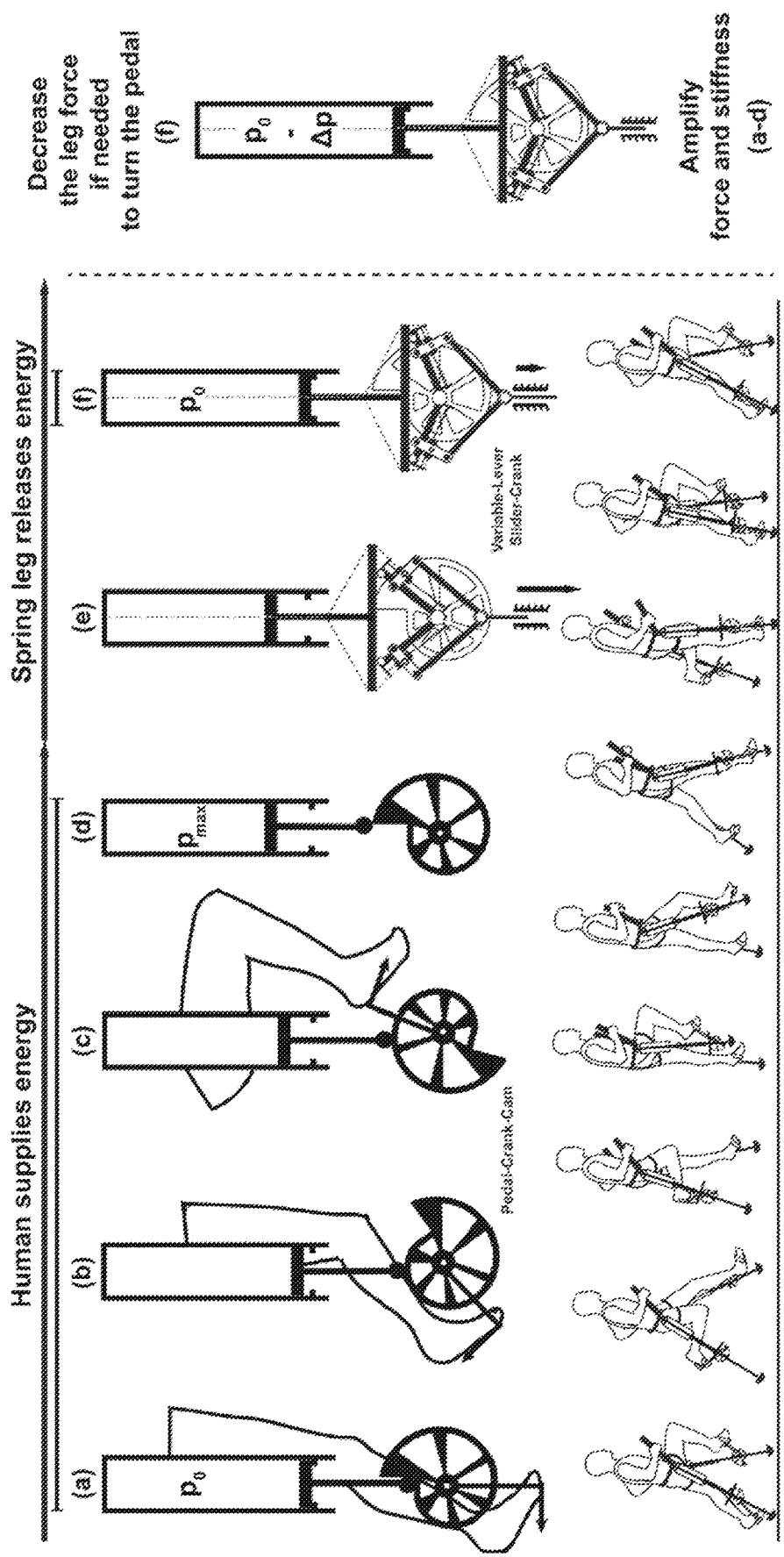
FIG. 4 is a diagram illustrating the human driven compliant transmission mechanism in running in accordance with embodiments of the present disclosure.

(ii) Spring leg releases energy (FIG. 4, steps e-f): Assuming vertical leg touchdown as in high-speed running, the air cylinder will be disengaged from the cam (due to the discontinuity in the cam shape) and start to release all its stored energy through the slider-crank mechanism (FIG. 4, step e). While the air cylinder releases energy, it applies force to the ground and thereby redirects the vertical motion and accelerates the body forward (FIG. 4, step f). When all energy is released from the cylinder, it engages with the cam again, and the entire cycle starts over.

(iii) Adaptation between steps (FIG. 4, step g): To mitigate the force-velocity relation of the human limb between cycles, the runner may use an effortless finger motion to switch on/off the pressure valve in the cylinder (FIG. 4, step f). Namely, releasing some of the air from the cylinder will lower the internal pressure $p_0$, which will consequently lower the force required for turning the crank (1), while the human supplies energy (FIG. 4, steps a-d). Releasing the air pressure may be done while the resistive force on the pedal is low, such as at the end of the current step and beginning of the next step (FIG. 4, step f).

To increase the force and stiffness of the spring leg as the runner picks up speed, the runner may also use an effortless finger motion to change the amplification ratio of the slider-crank mechanism (e in FIG. 4, steps a-d). Increasing the force and stiffness are required to redirect the motion of the body and to release the same amount of energy stored by the air cylinder during shorter ground contact time as speed increases. The overall effect of changing the amplification ratio of the slider-crank mechanism e is similar to effortlessly gear switching on the bicycle.

Discussion and Conclusion

Described herein are human-driven compliant transmission mechanisms that may be used to develop robotic exoskeletons driven by humans instead of motors. The mechanism uses cyclic limb motion to allow the human to supply energy while the legs are in the air. The mechanism accommodates the force-velocity trade-off and the configuration-dependent human leg force to enable the human to supply more energy. Finally, the mechanism amplifies human limb force and stiffness as it touches the ground, to extend human physical ability in legged locomotion tasks such as jumping, walking, fast walking with a heavy load, or running.

During legged locomotion, humans can only supply energy while the leg is on the ground. When jumping higher, or walking and running faster, the ground contact time reduces, and therefore, less force and power can be generated, due to the force-velocity trade-off in human muscles. One way to bypass this limitation is to use energy storage elements, for example, tendons in humans. However, the energy storage capacity of tendons is insufficient to increase height by repeated jumping. Furthermore, tendons cannot be pre-loaded in the air to provide more force and power when the foot touches the ground. Bicycles mitigate the force-velocity trade-off in human muscles with a rigid transmission mechanism. However, a rigid mechanism cannot store energy, and therefore cannot generate the explosive power required to augment locomotion tasks. To augment human peak performance in activities such as jumping, fast walking with a heavy load, or running, a compliant transmission is needed.

Furthermore, unlike the single variable gear transmission used in the bicycle, the spring leg requires two separate mechanically adaptable mechanisms; (i) the pedal-crank-cam spring mechanism that accommodates the force-velocity trade-off and the configuration-dependent leg force, and (ii) the variable arm slider-crank mechanism that amplifies the force and the stiffness of the spring leg.

In one aspect, the device described herein incorporates an air cylinder. In other aspects, a composite spring could be utilized. The composite spring could increase energy efficiency and/or make the device lighter.

While springs have been used to attempt augmented human locomotion, springs have not been effectively used to achieve meaningful improvements. This is because, unlike bicycles with variable gear transmission, fixed stiffness springs cannot accommodate the force-velocity limitation of human muscles and cannot provide more force and stiffness as the ground contact time reduces in event driven tasks, such as running. The human-driven compliant transmission mechanism is an energetically passive variable stiffness spring that can accommodate the aforementioned limitations. Compared to motor-driven energetically active compliant actuators, the proposed mechanism promotes the more recent concept of human-driven variable stiffness springs. Variable stiffness springs can potentially enhance event-driven tasks by emulating the function of a bicycle and a catapult, to exceed the biological limitations of the human limb. The same mechanism may be also combined with powered devices to reduce the energy consumption of motors and promote energy sustainability using human power.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

What is claimed is:

1. An augmented locomotion device to increase a legged locomotion speed of a user, comprising:
  a spring configured to be removably coupled to the user;

a variable stiffness mechanism that selectively modifies the stiffness of the spring, wherein the variable stiffness mechanism comprises an adjustable lever or cam; and a clutch for intermittently coupling and decoupling the spring from the user;

wherein the spring is compressed by the user during a first phase of a locomotion cycle and is released to propel the user when the user impacts a locomotion surface in a second phase of the locomotion cycle.

2. The augmented locomotion device of claim 1, wherein the spring is removably coupled to a leg of the user.

3. The augmented locomotion device of claim 1, wherein the spring is an air spring.

4. The augmented locomotion device of claim 1, further comprising an exoskeleton configured to be worn by the user.

5. A human-driven compliant mechanism, comprising:
an elastic energy storage element configured to capture energy supplied by a human;
an adjustable-length lever for varying stiffness of the elastic energy storage element, the adjustable-length lever having a length that is adjustable along a slider-crank mechanism;
a clutch for intermittently coupling and decoupling the elastic energy storage element from the human; and
wherein the human-driven compliant mechanism is operable to selectively release the captured energy supplied by the human to provide force and power beyond a physical capability of the human.

6. The human-driven compliant mechanism of claim 5, wherein the adjustable-length lever comprises a rotatable cam.

7. The human-driven compliant mechanism of claim 6, wherein the rotatable cam is driven by the human.

8. The human-driven compliant mechanism of claim 7, wherein the human-driven compliant mechanism is configured to be removably coupled to a leg of the human and wherein movement of the leg rotates the cam.

9. The human-driven compliant mechanism of claim 8, wherein the cam selectively varies a stiffness of the elastic energy storage element.

10. The human-driven compliant mechanism of claim 5, wherein the elastic storage element is a spring.

11. The human-driven compliant mechanism of claim 10, wherein the spring is an air spring.

12. The human-driven compliant mechanism of claim 5, wherein the human-driven compliant mechanism is an exoskeleton configured to be removably coupled to the human.

13. The human-driven compliant mechanism of claim 5, wherein the human-driven compliant mechanism is an artificial limb adapted to be removably coupled to the human.

14. An artificial limb operable to augment human movement, comprising:
a pedal configured to be removably coupled to a limb of a user;
a cam;
a crank coupled to the pedal and operable to rotate the cam;
a variable stiffness spring in mechanical communication with the cam and configured to selectively store and subsequently release energy generated by the human movement; and
a clutch for intermittently coupling and decoupling the variable stiffness spring from the user.

15. The artificial limb of claim 14, wherein the variable stiffness spring is a leaf spring.

16. The artificial limb of claim 15, wherein the artificial limb is operable to increase a running speed of the user.

17. The artificial limb of claim 14, wherein the variable stiffness spring is an air spring.

18. The artificial limb of claim 14, wherein the variable stiffness spring is a coiled spring.

19. The artificial limb of claim 14, wherein the artificial limb is adapted to be worn by the user and removably coupled to at least a portion of the user's leg.

\* \* \* \* \*